United States Patent
Yang et al.

(10) Patent No.: US 10,594,688 B2
(45) Date of Patent: Mar. 17, 2020

(54) PRIVACY-ENHANCED BIOMETRICS-SECRET BINDING SCHEME

(71) Applicant: Cross Match Technologies, Inc., Palm Beach Gardens, FL (US)

(72) Inventors: Bian Yang, Gjovik (NO); Christoph Busch, Gjovik (NO)

(73) Assignee: Cross Match Technologies, Inc., Palm Beach Gardens, FL (US)

(*) Notice: Subject to any disclaimer, the term of this patent is extended or adjusted under 35 U.S.C. 154(b) by 79 days.

(21) Appl. No.: 15/062,352

(22) Filed: Mar. 7, 2016

(65) Prior Publication Data

US 2016/0269178 A1   Sep. 15, 2016

Related U.S. Application Data

(60) Provisional application No. 62/130,433, filed on Mar. 9, 2015.

(51) Int. Cl.
*G06F 21/00* (2013.01)
*H04L 29/06* (2006.01)
(Continued)

(52) U.S. Cl.
CPC ............ *H04L 63/0861* (2013.01); *G09C 1/00* (2013.01); *H04L 9/0866* (2013.01); *H04L 9/3231* (2013.01)

(58) Field of Classification Search
CPC . H04L 63/0861; H04L 9/0866; H04L 9/3231; H04L 29/06809; G09C 1/00
See application file for complete search history.

(56) References Cited

U.S. PATENT DOCUMENTS 6,035,398 A   3/2000 Bjorn
6,085,320 A * 7/2000 Kaliski, Jr. ............. G06F 21/33
                                                        713/168

(Continued)

FOREIGN PATENT DOCUMENTS

WO   WO2000051244   8/2000
WO   WO2007036822   4/2007

OTHER PUBLICATIONS

Pim Tuy Is, Anton H. M. Akkermans, Tom A. M. Kevenaar, Geert-Jan Schrijen, Asker M. Bazen and Raimond N. J. Veldhuis, "Practical Biometric Authentication with Template Protection", Proceedings of AVBPA 2005, Lecture Notes in Computer Science, vol. 3546, Springer Verlag, pp. 436-446, (2005).*

(Continued)

*Primary Examiner* — Trong H Nguyen
*Assistant Examiner* — Amie C. Lin
(74) *Attorney, Agent, or Firm* — Schwegman Lundberg & Woessner, P.A.

(57) ABSTRACT

Generating a distinguishing feature vector by means of a distinguishing feature extractor module from a raw biometric feature of the individual, the distinguishing feature vector being configured for differentiating individuals is carried out in a method. Further steps include generating a robust feature vector by means of a robust feature extractor module from the raw biometric feature of the individual; generating a cryptographic key from first auxiliary data based on the secret of the individual and optionally other data; using the robust feature vector together with second auxiliary data in a standard cryptographic module configured to perform a standard cryptographic function keyed by the cryptographic key; and binding the results produced by the standard cryptographic module and the distinguishing feature vector together as fused data by means of a modulo-N addition operation module, wherein N=2, 3, . . . , i.e. N is an integer greater than 1.

10 Claims, 6 Drawing Sheets

(51) Int. Cl.
*G09C 1/00* (2006.01)
*H04L 9/32* (2006.01)
*H04L 9/08* (2006.01)

(56) References Cited

U.S. PATENT DOCUMENTS

| | | | |
|---|---|---|---|
| 7,711,152 B1 | 5/2010 | Davida et al. | |
| 8,290,221 B2 | 10/2012 | Choi et al. | |
| 8,838,990 B2 | 9/2014 | Boult et al. | |
| 8,868,923 B1* | 10/2014 | Hamlet | G06F 21/00 326/8 |
| 2003/0101349 A1 | 5/2003 | Wang | |
| 2007/0180261 A1 | 8/2007 | Akkermans et al. | |
| 2007/0293319 A1* | 12/2007 | Stamper | A63F 13/12 463/42 |
| 2010/0119126 A1* | 5/2010 | Rane | G06K 9/00067 382/125 |
| 2010/0146292 A1* | 6/2010 | Shi | H04L 9/321 713/189 |
| 2012/0014520 A1* | 1/2012 | Baughman | H04L 9/0866 380/44 |
| 2013/0004033 A1 | 1/2013 | Trugenberger | |
| 2013/0283035 A1 | 10/2013 | Tomlinson et al. | |
| 2015/0318994 A1* | 11/2015 | Walsh | H04L 9/3236 713/182 |
| 2016/0072798 A1* | 3/2016 | Jhingran | G06F 21/32 726/5 |

OTHER PUBLICATIONS

A. Jain et al., Biometric Template Security, EURASIP Journal on Advances in Signal Processing, vol. 2008, Jan. 2008.

C. Rathgeb et al., A survey on biometric cryptosystems and cancelable biometrics, EURASIP Journal on Information Security 2011:3 (2011).

J. Breebaart et al., Biometric Template Protection, Datenschutz and Datensicherheit-DuD 33 (5), 299-304, 2009.

ISO/IEC 24745, Information Technology—Security Techniques—Biometric Information Protection, 2011.

A. Juels et al., A fuzzy commitment scheme, 1999.

A Juels et al., A fuzzy vault scheme, 2002.

T. Boult, Revocable Fingerprint Biotokens: Accuracy and Security Analysis, IEEE CVPR 2007.

A. Jin et al., Biohashing: two factor authentication featuring fingerprint data and tokenised random number, Pattern Recognition, vol. 37, Issue 11, Nov. 2004, pp. 2245-2255.

B. Yang et al., Cloud Password Manager Using Privacy-Preserved Biometrics, IEEE IWCCSP 2014.

J. Hermans et al., Shattering the Glass Maze, International Conference of the Biometrics Special Interest Group (BIOSIG), 2014.

Web Page titled Data breach; printout from http://en.wikipedia.org/wiki/Data_breach, printed Jun. 12, 2019.

Web Page titled Fingerprints are not fit for secure device unlocking; printout from https://srlabs.de/spoofing-fingerprints/, printed Jun. 12, 2019.

Web Page titled Block cipher mode of operation; printout from http://en.wikipedia.org/wiki/Block_cipher mode_of operation, printed Jun. 12, 2019.

* cited by examiner

PRIVACY-ENHANCED BIOMETRICS-SECRET BINDING SCHEME

TECHNICAL FIELD

The present invention relates to a binding scheme for binding biometric data of an individual and a secret of the individual with enhanced privacy to safeguard personal data in untrusted computing environments.

BACKGROUND

Using biometric data derived from a biometric characteristic for the purpose of identity authentication provides both security and convenience for an individual to manage his or her personal files, such as private photos, videos, medical records, health records, financial records, work sheets, etc., or other digital assets, such as virtual reality assets, digital arts collections, etc. This is thanks to the unique and permanent linkage of biometric characteristics to the corresponding individual, being usually a natural person. Unlike a cryptographic key or a password that are transferable to other people, who may be either an authorized individual or a malicious attacker, biometric characteristics cannot be transferred from one person to another person. Thus, biometric characteristics can be used as a reliable link between a person's identities and the person himself or herself. This unique link enables biometric data to replace passwords in numerous scenarios.

However, there are challenges to master, if biometric characteristics shall be used for identity authentication purposes: (1) security concerns, (2) privacy concerns, and (3) fuzziness in authentication. As it regards (1) security concerns, while providing convenience to the individual, biometric characteristics' permanence implies that once a biometric template as the references representing the biometric characteristic are lost or hacked the biometric trait cannot be revoked and renewed like passwords. Thus, the individual is subject to a permanent security risk that the lost or stolen biometric data may be used to impersonate the individual. As it regards (2) privacy concerns, in addition to using unique biometric data to crosslink registered services of an individual by his or her unique biometric characteristics, the biometric data itself may disclose personal information, such as the health status in some cases. Finally, as it regards (3) fuzziness in authentication, unlike a password or a secret key that can be exactly matched, biometrics works with probabilities and thus match and non-match decisions are prone to errors.

To tackle the security concerns (1) and privacy concerns (2), the concept of the so-called biometric template protection was proposed, e.g. described by A. Jain, et. al., in "Biometric Template Security", EURASIP, Journal on Advances in Signal Processing, Volume 2008, January 2008, Article No. 113. Under this concept, biometric templates can be transformed assisted by auxiliary data into diversified and uncorrelated templates in an irreversible and unlinkable way; biometric template protection is also described in ISO/IEC 24745, "Information Technology—Security Techniques—Biometric Information Protection", 2011.

To cope with the challenges brought by biometrics' fuzziness in authentication (3), and also to ease biometrics' integration into existing cryptographic mechanisms, it was proposed to bind biometric data with an ephemeral secret or a personally-owned secret, such as a PIN, a password, a secret key, etc., to create a protected biometric template. Such binding schemes include (i) the fuzzy commitment scheme, e.g. described by A. Juels et. al., in "A fuzzy commitment scheme", CCS '99 Proceedings of the 6th ACM conference on Computer and communications security, 1999, (ii) fuzzy vault, e.g. described by A. Juels et. al., in "A fuzzy vault scheme", Proceedings of 2002 IEEE International Symposium on Information Theory, 2002, (iii) biotokens, e.g. described by T. Boult, in "Revocable Fingerprint Biotokens: Accuracy and Security Analysis", IEEE CVPR 2007, biohashing (iv), e.g. described by A. Jin., in "Biohashing: two factor authentication featuring fingerprint data and tokenized random number", Pattern Recognition, Volume 37, Issue 11, November 2004, Pages 2245-2255, biometric password managers (v), e.g. described by B. Yang et. al., in "Cloud Password Manager Using Privacy-Preserved Biometrics", IEEE IWCCSP 2014, etc. just to name a few examples. All the fore-going protection schemes (i) to (v) usually suffer from performance degradation or insufficient security.

Prior art key binding schemes as used in the fuzzy commitment scheme (i) and fuzzy vault (ii), including the underlying mechanism, as known e.g. from WO 2000/051244 A8, U.S. Pat. No. 8,290,221 B2, US 2007/0180261 A1, or WO 2007/036822 A1 are based on value offsetting or XOR operation, which will easily leak the other party if one of the two inputs to XOR, i.e. the biometric feature data or the secret, is leaked. In the biotoken method (iii), as known from e.g. U.S. Pat. No. 8,838,990 B2, some parts of the biometric templates are not protected. Thus, it is able to establish a linkage across the protected biometric templates from the same plain template. In addition, leakage of the cryptographic key will lead to the decryption of the protected biometric templates. In biohashing (iv), as known e.g. from A. Jin, "Biohashing: two factor authentication featuring fingerprint data and tokenized random number", Pattern Recognition, Volume 37, Issue 11, Nov. 2004, Pages 2245-2255, leakage of multiple cryptographic keys will lead to the reversibility of the protected biometric templates. In biometric password managers (v), as known e.g. from B. Yang et. al., "Cloud Password Manager Using Privacy-Preserved Biometrics", IEEE IWCCSP 2014, once the random generated secret is leaked, the individual's master secret will be disclosed as well.

Further, binding of a cryptographic key and biometric data, as known e.g. from US 2013/0004033 A1, is proven to be not secure, as discussed by J. Hermans et. al., in "Shattering the Glass Maze", International Conference of the Biometrics Special Interest Group (BIOSIG), 2014. Also the biometric performance thereof is not desirable. Still further, a key generation scheme using biometric data, as known from U.S. Pat. No. 6,035,398 A, suffers from low entropy and is not secure enough for authentication uses. Furthermore, In U.S. Pat. No. 7,711,152 B1 or US 2003/0101349 A1, encryption and decryption are separated from the biometric feature comparison, which requires dedicated trusted computing environment like a TPM (Trusted Platform Module) to do the biometric feature comparisons. Moreover, US 2013/0283035 A1 discloses digital file authentication using biometric data, but only a cryptographic hash is used to protect the biometric templates which is practically challenging due to the sensitivity of hashes, which makes protected biometric templates unable to be compared directly.

SUMMARY

In view of the discussion above, it is an object to provide a solution for using biometric data in authentication of an individual's identity in which better security and privacy protection of the biometric characteristic' owner, i.e. the individual, can be achieved.

The object is attained with the features of the independent claims. Other exemplary embodiments and advantageous modifications ensue from the dependent claims, the description, and the drawings.

The crux of the herein proposed solution lies in a novel data binding scheme for binding in a secure way biometric data of an individual with a secret of the individual, which allows biometric feature comparison in untrusted computing environment with high-accuracy. The novel data binding scheme is (a) a truly irreversible data binding, (b) tunable in blending a proportion of the biometric data and the secret, and (c) cryptographically-level secure by exploiting a biometric feature based counter data generation for standard encryption such as a block cipher. The secret of the individual, which may be either randomly generated by the individual himself or herself or assigned from a service provider, is bound with the individual's biometric data together to generate a verifiable biometric template for identity authentication use.

The fused data generated from the novel data binding scheme for binding in a secure way biometric data of an individual with a secret of the individual can be used directly as a protected (also known as secure, or privacy-enhanced, or privacy-preserved) biometric template that can be compared to another protected biometric template resulting in a comparison score indicating the similarity of the two biometric features corresponding to the two protected biometric templates.

The novel data binding scheme may be used in a plurality of applications, for example in protection of personal files (Personal File Protection), in management of personal passwords (Personal Password Manager), in generating encrypted fuzzy indexing of personal files, and in the creation and verification of the ownership of personal digital assets etc. For all these different applications, an individual as the owner of the biometric data and a personal secret, only needs to memorize the personal secret, which may be e.g. a PIN, a password, etc., as a one and only master secret as a master key. It may even be possible that the individual does not need to memorize the personal secret, at all, if the individual chooses to do so.

Moreover, the pair of the individual's biometric data and personal secret (i.e. the {biometric data, personal secret} pair, for short) may be used to respectively link to independent identification information, such as e.g. passwords to online internet services, a PIN code in online banking, a private cryptographic key to secure email, and so forth, for different applications, in a secure way in the sense that compromise of such independent identification information, usually regarded as secrets used by the applications, will never leak the information about the {biometric data, personal secret} pair. In other words, the personal data may not directly be protected by biometric data bound with the personal secret. Instead, the personal data may be protected by independent secrets for different applications respectively but all these independent secrets may be securely managed by the biometric data of the individual bound with the personal secret. Thus, for all cases, the individual needs only to memorize one personal secret.

Accordingly, a first aspect as the core of the present invention concerns the here proposed novel binding scheme for binding biometric data and a secret of an individual (herein below called novel binding scheme, for short).

Accordingly, a method of binding biometric feature data of an individual with a secret of the individual comprises:
(a) generating a distinguishing feature vector by means of a distinguishing feature extractor module from a raw biometric feature of the individual, the distinguishing feature vector being configured for differentiating individuals,
(b) generating a robust feature vector by means of a robust feature extractor module from the raw biometric feature of the individual,
(c) generating a cryptographic key from first auxiliary data based on the secret of the individual and optionally other data,
(d) using the robust feature vector together with second auxiliary data in a standard cryptographic module configured to perform a standard cryptographic function keyed by the cryptographic key, and
(e) binding the results produced by the standard cryptographic module and the distinguishing feature vector together as fused data by means of a modulo-N addition operation module, wherein N=2, 3, . . . , i.e. N is an integer greater than 1.

In certain embodiments N is set to 2 so that the modulo-N addition operation module becomes an exclusive-OR operation module or XOR operation module.

Standard cryptographic functions are understood herein as those well established in standardized and commercialized cryptographic tools, such as encryption functions according to AES (Advanced Encryption Standard), 3DES (triple Data Encryption Standard), RSA (Rivest, Shamir and Adleman), SHA-n (secure hash algorithm n, e.g. n=3), etc. just to name a few. In other words, the standard cryptographic module implements an encryption function that is proven in security and efficiency either by theories or practical tests. The standard cryptographic function may also be a hash function or an encryption encoder like a block cipher encoder, or any future crypto-mechanism that can be proven secure, nothing more than that. If the standard cryptographic function is a hash function, it outputs a hash value; if the standard cryptographic function is an encryption encoder, it outputs encrypted data, i.e., cipher text.

In this document, in accordance with e.g. ISO/IEC 2382-37, "biometric data" is understood as a general concept, "biometric feature data", e.g., fingerprint minutia, iris code, face PCA (principal component analysis) vector, etc., is a formatted descriptor extracted from corresponding "biometric characteristic data" which is a qualitative description, such as a ridge pattern, a iris pattern, a face grey-scale pattern etc., of "biometric sample data" of the corresponding "biometric characteristic", e.g., captured image of a fingerprint, an eye, and a face. The "biometric feature data", as the data that can be directly compared for the purpose of differentiating biometric subjects, i.e. individuals, may be derived from almost any type of biometric characteristic (or conventionally called "biometric modalities") that can be obtained from an individual by suitable sensors, such as 2D/3D face picture, fingerprint scanning, iris scanning, voice authentication, face recognition etc.

It is noted that a biometric feature can be extracted from a biometric characteristic which is from biometric sample data. A biometric feature can be also extracted from a biometric feature as well. Here "biometric feature" is used instead of "biometric sample data" because it implies that the two extracted features can be generated from any existing plain (i.e. raw) biometric feature. This indicates the compatibility of the proposed scheme. That is to say, the proposed binding scheme can process plain (raw) biometric features generated by any existing biometric system, instead of relying on special biometric features extracted and dedicated to protection use. Thus, the method of binding biometric feature data of an individual with a secret of the individual take as input a raw biometric feature, i.e., a formatted descriptor that can be compared directly, e.g., fingerprint minutia, facial PCA vector, or iris code etc. just to name some examples here.

The distinguishing feature vector is configured for comparison, i.e. is configured as to differentiate individuals. In other words, the distinguishing feature vector contains information for biometric recognition use.

The robust feature vector is configured to be a vector that is ideally always the same when extracted from different biometric samples of a particular biometric characteristic type, i.e. the robust feature vector is independent from differences in attributes' values of the biometric feature. The robust feature vector helps that the standard cryptographic module for the same second auxiliary data input can output different random data which can protect distinguishing feature vector. That is to say, the robust feature vector is specific to the distinguishing feature vector and thus the distances among different distinguishing feature vectors will not be kept in the fused data to ensure the security thereof. In other words, the purpose of blending the distinguishing feature vector and the robust feature vector is to use the robust feature vector which comes from the raw biometric feature to diversify the output of the cryptographic function, in order to ensure the security of the protection of the distinguishing feature vector when using the same personal secret to bind different biometric features.

Basically, a user personal secret may be used as the first auxiliary data. A cryptographic function, such as a crypto hash function, may be used to generate an encryption-key-like input to the standard cryptographic module from the user's personal secret. The second auxiliary data may be public data, for example, as the standard cryptographic module may need some parameters. The term "auxiliary data" is used here compliant to ISO 24745.

By the term "irreversible", it is meant that from the fused data and optionally any auxiliary data it is hard to get any information about the two fused data elements, i.e. the biometric feature data and the secret which are fused.

The method according to the first aspect may further comprise: tuning the weight of biometric information bound in the fused data by adjusting the entropy of the robust feature vector output from the robust feature extractor module and the entropy of the distinguishing feature vector output from the distinguishing feature extractor module.

The robust feature vector is input to the standard cryptographic module which performs a standard cryptographic function (crypto-function) which is inherently sensitive to bit errors. Therefore, the robust feature vector may be made stable for the same biometric characteristic from which the biometric feature is extracted. In other words, the biometric feature is inherently fuzzy, i.e. it is not always the same when presented at different times, but the robust feature vector is made to be stable, i.e., tolerant to the inherent noise in the biometric feature. Thus, by means of adjusting the entropy the "robustness" and "distinguishability", respectively, of the robust feature vector and the distinguishing feature vector, respectively, can be adjusted as needed. Adjusting can be done by, for example, tuning the quantization step size and thus generating quantization results represented in different bit lengths or dynamic ranges of the respective feature vector. By virtue of the respective feature extractor module, one may tune the feature extractor module to generate a feature vector with different levels of entropy, i.e. the information amount that can be used to distinguish different biometric features, and thus the weight of biometric information used in authentication. A lower weight helps protecting the privacy while a high weight helps increasing the security of the authentication process when the master secret is leaked.

According to a second aspect, the novel binding scheme may be combined with aspects of the known fuzzy commitment scheme. Accordingly, the method according to the first aspect may further comprise: combining the fused data by means of a fuzzy combination encoding module with data to be protected and/or application dependent data into helper data.

The data to be protected may be a secret known to the individual, such as a password, or a randomly generated secret, such as a randomly generated password, not known to the individual. The data to be protected may also be a legacy file encryption key, which is known to the user, or an ephemeral random secret key randomly generated, which is not known to the individual.

The fuzzy combination encoding module and a corresponding reverse operation module, i.e. a fuzzy combination decoding module, are a part of the known conventional fuzzy commitment scheme, e.g. as described in WO 2000/051244 A8. The fuzzy combination encoding module takes as input two binary vectors, namely one fuzzy vector and one exact vector, and combines the two vectors together by the exclusive-OR (XOR) binary operation after encoding the exact data by an error-correction coding process. The fuzzy vector, as indicated by its name, can be generated from those inherently fuzzy data such as biometric data or multimedia data. The exact data are by purpose the data to be recovered exactly by the fuzzy combination decoding process. An error-correction coding process enables that the fuzziness, in the form of bit errors, in two fuzzy vectors can be corrected and thus the exact data can be perfectly recovered if the fuzziness is within the adopted error-correction codes' correcting capability. It is worth to be noted that the fuzzy combination encoding and decoding, respectively, is not exactly the same as the original fuzzy commitment scheme in WO 2000/051244 A8. Thus, the fuzzy commitment scheme is not described here in detail.

A third aspect concerns a personal password manager as a first application embodiment of the novel binding scheme. Accordingly, in method according to the second aspect, the first auxiliary data may comprise a master secret as the secret of the individual, the second auxiliary data may comprise crypto-function parameter data such as a key to a cryptographic hash function or a nonce (or initialization vector) data used in a block cipher, and the data to be protected may comprise a password being a legacy password or a randomly generated password, whereby the helper data are secure password vault data.

A forth aspect concerns a personal file protection as a second application embodiment of the novel binding scheme. Accordingly, the method according to the second aspect may further comprise: encrypting a digital file by means of a standard encryption encoder module which is keyed by an encryption key and which is configured to receive the digital file as input and to output an encrypted file.

Further, if the digital file is already encrypted by a legacy file encryption key, then the legacy file encryption key may be used as the encryption key in the step of encrypting the digital file. The term "legacy" used herein, e.g. in "legacy file encryption key", means that this parameter or value is already established, e.g. in the context of the file encryption by any file encryption application, key for file encryption.

Otherwise, if the digital file has not been already encrypted, then an ephemeral random secret encryption key may be generated by means of an ephemeral random secret encryption key generator module which ephemeral random secret encryption key can be used as the encryption key.

As an already used legacy file encryption key can remain, the individual does not need to re-encrypt existing cipher files. Thus, there are basically two different cases: (1) there is already an encryption key established earlier by the file encryption application; or (2) the individual wants to use the file encryption application but does not have an encryption key to do so.

Particularly, the first auxiliary data may comprise a master secret as the secret of the individual, the second auxiliary data may comprise application specific data and/or unique identification data of the digital file, and the data to be protected in the fuzzy combination encoding module may comprise the legacy file encryption key or the ephemeral random secret encryption key. As a result, the helper data are encryption parameter vault data.

Application specific data may be public information about the digital file, such as a file-specific counter, nonce data used by a cryptographic function, etc.

It is noted, the file encryption application may be any external service that provides file encryption to which the individual as a user may be already registered. The here proposed binding scheme just provides a more convenient and more secure encryption key management for this application context.

A fifths aspect concerns the generation of an encrypted fuzzy index for digital files as a third application embodiment of the novel binding scheme. Accordingly, in the method according to the first aspect of the invention: the first auxiliary data comprises a master secret of the individual and meta data of a digital file, alternatively, the first auxiliary data comprises a result output by a robust hash-function module that is configured to perform a hash-function on the master secret of the individual and on content data of a digital file; the second auxiliary data comprise crypto-function parameter data such as a key to a cryptographic hash function or nonce (or initialization vector) data used in a block cipher. As a result, the fused data comprises encrypted fuzzy index data for the digital file.

The meta data of the digital file may be e.g. an original index, an annotation, a timestamp, a copyright or authorship claim of the file, etc. which are exact data that can be directly processed as the first auxiliary data by the novel binding scheme.

The content data of the digital file may be e.g., a content descriptor of a text file, a photo file, or an audio file, etc. The content descriptor is normally fuzzy data that may be converted to exact data by a robust hash function.

Further, the method of the fifth aspect may further comprise: embedding the encrypted fuzzy index data by means of an index embedding module into the plain or encrypted digital file. As a result, the file is made indexable by means of the encrypted fuzzy index.

The encrypted fuzzy index can be compared to all reference indices in a database in Euclidean or other distance metrics, without disclosing the plain text of the file content or decrypting an encrypted file for comparison.

The embedding step may be implemented as a reversibly watermarking of media data, or appending data to a text or a binary file, or content encoding in which the encrypted fuzzy index is encoded into the file data format and thus becomes a part of the file.

A sixth aspect concerns ownership creation and verification for personal digital assets as a third application embodiment of the novel binding scheme. Accordingly, in the method according to the first aspect of the invention: the first auxiliary data may comprise a robust hash-function result obtained from a master secret of the individual, signed authorized ownership certificate data, and content descriptor data generated by means of a content descriptor generator module from plain or encrypted digital asset data; the second auxiliary data may comprise crypto-function parameter data such as a key to a cryptographic hash function or nonce (or initialization vector) data used in a block cipher. As a result, the fused data comprises encrypted ownership information data for the digital asset data.

The signed authorized ownership certificate data may be e.g. a certificate from a service provider such as a game dealer, software seller, art work dealer, etc.

The method according to the sixth aspect may further comprise: combining the encrypted ownership information data as the fused data by means of a fuzzy combination encoding module with an ephemeral random secret key into owner ship vault data. By means of the fuzzy combination encoding the encrypted ownership information is diversified to make them unlinkable among different digital assets even though they share the same ownership. The unlinkability makes the ownership verification totally anonymous.

The method according to the sixth aspect may further comprise: embedding the ownership vault data into the plain or encrypted digital asset data by means of a data embedding module. If the ownership vault data generated from the encrypted ownership information by the fuzzy combination encoding are embedded to the plain or encrypted digital asset, the digital asset becomes verifiable in ownership in an anonymous way.

The data embedding module may be configured to perform at least one of the following: reversible watermarking the media data, data appending to text or binary file, content encoding, i.e. to encode the encrypted fuzzy index to the file data format and thus as part of the file.

A seventh aspect concerns the implementation of the methods according to the first to sixth aspects by a digital computing device. Accordingly, an apparatus for data processing comprising a digital processing unit, working memory for storing data to be processed and processing results, an interface for receiving data to be processed and an interface to output processing results, and permanent memory for storing program code with computer program instructions to be executed by the digital processing unit. The processing unit is configured by the stored program code to perform one of the methods according to one or more of the first to sixth aspects.

The apparatus may be one of the group comprising: a personal computing device, a smart phone device, a personal digital assistant device, an automatic teller machine, a logical and physical access control system, an automatic border control system, etc.

The biometric feature in all aspects may be extracted from a biometric characteristic (or called modality) that can be obtained from an individual by one or more suitable sensors, wherein the apparatus comprises or is coupled or is connected to at least one sensor respectively configured for recording a corresponding biometric sample, such as a voice sample of the individual, taking a 2D or 3D facial picture or a 2D or 3D ear picture of the individual, scanning a fingerprint or a finger vein pattern of the individual, scanning a hand/foot geometric pattern or a palm/foot print, scanning an iris or eye vascular pattern of the individual.

The herein proposed novel binding scheme features the following advantages:

(i) Truly irreversible data binding: By the term "irreversible", it is meant that from the data binding result and possibly any auxiliary data it is hard to get any information about the two fused data elements, i.e. the biometric data and the personal secret that are fused in the fuzzy commitment scheme. An obvious security drawback in the prior art fuzzy commitment scheme was the offsetting or XOR operation used in binding of the two data elements together. The breach of an arbitrary one element out of the biometric data and the personal secret automatically led to the breach of the other element due to the reversibility of the offsetting or XOR operation. For example, when a prior art fuzzy commitment scheme was used to bind an individual's biometric data with a password as a personal identifier used for access control to services, such as an online banking service or an offline payment in supermarket, the protection of the individual's biometric data relies entirely on how well the passwords are managed in the service providers' customer databases. If the customer database is compromised, the customers' biometric data are not protected any more due to the reversibility of the value offsetting (subtraction or addition) or XOR operation. On the other hand, biometric feature data is not regarded as secret and some of biometric traces can be easily collected and used to make a fake biometric characteristic for spoofing a biometric sensor. In the prior art fuzzy commitment schemes, leakage of a biometric feature has even more serious consequence, namely the leakage of the personal secret, such as the password mentioned above, used in the access control to the services.

The herein proposed novel binding scheme addresses the "reversibility" drawback of known fuzzy commitment schemes and makes the data binding process "truly irreversible" in the sense that one element's leakage cannot cause the leakage of the other one in a computationally secure sense. In the case both the personal secret and the biometric data are well kept, the fused data has a perfect security, comparable to the classic one-time-pad (OTP) encryption technique, in the sense that no information about both the personal secret and the biometric data can be leaked even though an attacker should have unlimited computational resource. So far, all practically-useful prior art binding schemes, such as the ones discussed above, i.e., XOR for fuzzy schemes, symmetric encryption in the biotoken method, random projection in biohashing etc., are in essence reversible. As the chances of leaking either the biometric data or a personal secret, e.g. a password, is not negligible, the truly irreversible novel binding scheme shows distinct advantages over existing schemes.

(ii) Maximized convenience for use for individuals: For all different applications, the individual as the owner of the biometric data and the personal secret, solely needs to memorize the personal secret, e.g. a PIN, a password, etc., as one same master key or even does not need to memorize a personal secret, at all. The {biometric data, personal secret} pair may be used to link to independent identification information for different applications, such as passwords to online internet services, PIN codes to online banking, private cryptographic keys to secure email, etc., respectively, in a secure way in the sense that compromise of the particular secret for a particular application will never leak the information about the {biometric data, personal secret} pair.

(iii) Tunable proportion configuration of the two factors: By virtue of the respective feature extractor module used in the herein proposed novel binding scheme, an individual can tune the respective feature extractor module to generate a feature vector with different levels of entropy, i.e. the information amount from the raw biometric feature data, and thus the proportion of biometric information used in authentication. Lower proportion helps protecting the privacy while high proportion helps increasing the security of the authentication process when the personal secret should be leaked.

(iv) Feasible on unordered data sets: When protecting unordered data sets, e.g. unstructured data files, fingerprint minutiae data, a set of geographic points, etc., because there is no order, i.e. indices, assigned to the data sets, each data element has to be protected using the same encryption key without any local information as a counter to enhance the security. None of existing prior art biometric template protection schemes can well address this challenge except the here proposed novel binding scheme. By virtue of the robust feature vectors, which are extracted from the raw biometric data and involved as parameters, e.g. as a counter, in the crypto-function operation, the novel binding scheme can protect such unordered data sets in a higher secure way.

(v) Indexable in the protected form: Unlike a hash as an identifier for comparison as used in prior art fuzzy schemes, in the here proposed binding scheme, the binding result, which is fuzzy in essence, can be used for comparison. This enables distance calculation in the protected domain. Therefore, the encrypted fuzzy indices, as generated in the Encrypted Fuzzy Indexing Personal Files process, can be used to retrieve files an individual wants to get without either disclosing the key words for search or decrypting the files for content recognition. This is especially suitable for indexing protected personal files in untrusted computing environment like a public cloud.

(vi) Anonymous ownership verification: By virtue of the herein proposed novel binding scheme and the fuzzy commitment scheme ownership information can be diversified in a correspondingly novel ownership creation and verification for personal digital assets process. Thereby, anonymous ownership verification can be realized, i.e., the digital assets' ownership can be verified by the biometric data and the personal secret without disclosing the plain identity and ownership information, if not required.

(vii) Compatibility with existing encryption keys and encrypted files: By virtue of the fuzzy commitment scheme, the fused data generated from the herein proposed novel binding scheme can be combined with an existing encryption key for an existing encrypted file without the need of re-encryption.

Summarizing, from the individual user's perspective, the invention has the following attractive merits when being used for safeguarding personal data in untrusted environments:

(a) no privacy concerns over biometrics: there is almost no chance for an attacker to learn the individual's biometric information even if the individual's secret is stolen;

(b) no decryption: there is no possibility of decryption of the fused data and thus no worry about information leakage in an untrusted environment like a cloud;

(c) cryptographically secure: the binding scheme has perfect security, i.e. secure against even unlimited computational resource, if both the biometric data and the secret are well kept; and still has computational security, depending on biometric feature's entropy and the security level of the adopted cryptographic component, if one of the two elements, i.e. the biometric data or the personal secret, is breached;
(d) option of omission of the personal secret: the personal secret to be bound with the biometric feature can be replaced by a public parameter and thus there is no need to keep a personal secret, wherein the security of the scheme depends on the entropy of the biometric feature vectors;
(e) compatible with various applications: the novel binding scheme can be used for various applications such as but not limited to personal file protection, password management, secure indexing of personal files in untrusted environment, ownership verification of personal digital assets, etc.;
(f) only one (master) personal secret to memorize: the individual needs memorizing only one personal secret for all different applications because the biometric information and the master personal secret can manage the secrets used for different applications.

Finally, experimental tests of the here proposed novel data binding scheme over fingerprint ISO minutiae templates from the public data FVC2002DB2 and FVC2006DB2 achieved comparable accuracy performance as other plain or protected template comparison algorithms in the secret-stolen scenarios, i.e., comparing all protected fingerprint templates, i.e., the fused data, using a same secret for binding, and almost zero error rates for the two-factor case, i.e. protected templates are compared using individual-specific secrets.

PREFERRED EXEMPLARY EMBODIMENTS

Figure 1A:
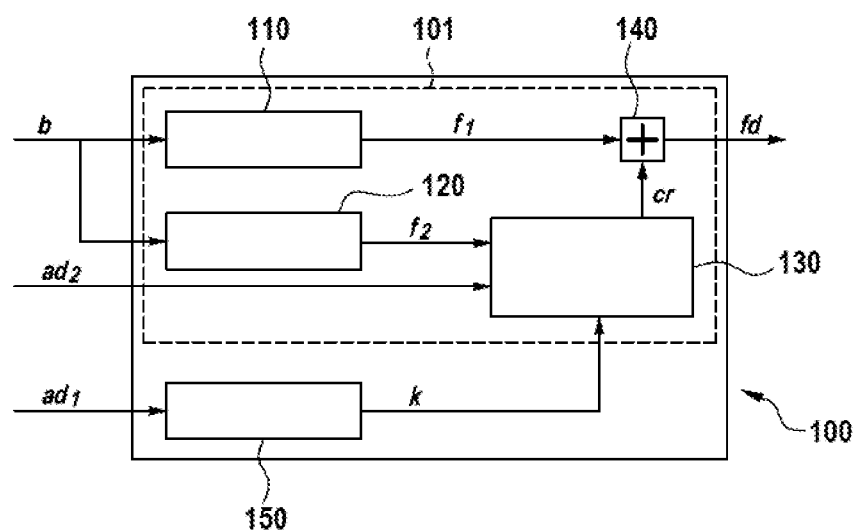
FIG. 1A illustrates a block diagram of a binding module configured to implement the herein proposed binding scheme.

Other advantages, features, and details of the invention ensue from the following description in which exemplary embodiments are described in detail with reference to the drawings figures. The features mentioned in the claims and in the description can each be essential in and of themselves or can be essential in any combination with one another. In the same way, the features mentioned above and explained in greater detail here can each be used by themselves or be united in any combination with one another. Some parts or components that are functionally similar or identical have been provided with the same reference numerals. The terms "left," "right," "top," and "bottom" used in the description of the exemplary embodiments refer to the drawings in an orientation in which description of the figures can be normally read and the reference numerals can be normally read. The embodiments shown and described are understood to be non-exclusive. The purpose of the detailed description is to provide information to the person skilled in the art; for this reason, known circuits, structures, and methods are not shown or explained in detail in the description in order not to complicate comprehension.

Figure 1B:
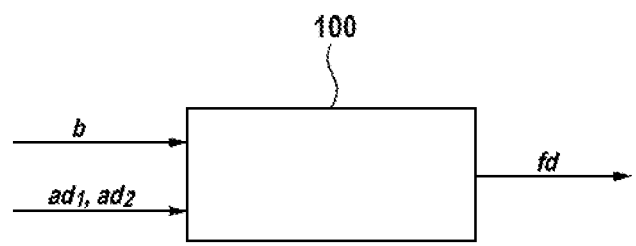
FIG. 1B illustrates an embodiment of the internal structure of the binding module of FIG. 1A.

FIG. 1B shows a block diagram of the novel binding module 100 that is configured to implement the herein proposed novel binding scheme for binding biometric data of an individual and a personal secret of the individual. FIG. 1A shows a possible internal structure of the binding module 100 of FIG. 1B in greater detail.

The novel binding module 100 is configured to carry out the here proposed binding process for binding biometric data of an individual and a personal secret of the individual. The term "module" used here expresses that a particular process can be implemented as a module providing a particular function. Any process discussed here can be implemented by software means such as a correspondingly configured software module. Alternatively, an implementation may be made by the use of correspondingly configured hardware such as correspondingly configured FPGAs (field programmable gate arrays) or any other suitable hard wired circuitry as a hardware module. Of course, any configuration in between these two ways of implementation, namely a full implementation by software and full implementation by hardware, is possible as well, i.e. a combination of particular parts implemented in software and other parts implemented in hardware. As the implementation provides basically no new aspects for the skilled person, a description thereof is omitted here. That is to say, the terms "process" and "module" are used here correspondingly. Note, a particular process itself may be decomposed into several processes on a lower level; correspondingly, a particular module providing a particular function may be composed of one or more (sub-)modules providing particular (sub-)functions.

The binding module 100 comprises two parts, namely a binding operation module 101 and a cryptographic hash function module 150.

The module 101 is the core part of the here proposed novel binding scheme, consisting of a distinguishing feature extractor module 110, a robust feature extractor module 120, a cryptographic function (crypto-function) module 130, and a modulo-N addition operation module 140 (denoted in FIG. 1B by a square with a plus sign inside). When N equals 2, the modulo-N addition operation module 140 becomes an exclusive-OR operation module, which may be abbreviated as XOR-operation module.

The modules 110, 120 can implement any process preforming any feature extraction method that outputs distinguishing feature vectors $f_1$ (i.e. comprising information that can be used to differentiate biometric subjects, i.e. individuals) and robust feature vectors $f_2$ (i.e. comprising information that can be used to generate stable cryptographic parameters), respectively.

A distinguishing feature vector $f_1$, among other examples, can comprise those biometric features popularly adopted in existing biometric systems, for instance, minutiae features from a fingerprint, eigenvalues in principal component analysis (PCA) of a facial sample, binary iris code from iris patterns, etc. just to name a few. It is noted, the distinguishing feature vector $f_1$ can comprise particularly any new type of features to be developed in the future that can approximately uniquely characterize a biometric subject (individual) for recognition purpose.

A robust feature vector $f_2$, among other examples, can comprise those biometric features with lower distinguishability for accurately recognizing biometric subjects (individual) compared to those distinguishing biometric features described above but have a higher resilience to the inherent noise in biometric samples. Such inherent noises in biometric samples can be, among other possibilities, for example distortion in feature representation caused by rotation, translation, and scaling in fingerprint and facial samples, pose and lighting condition variance in facial samples, eyelash occlusion in iris pattern, etc. Herein, the robust feature vector $f_2$ extracted from the biometric feature b should be robust enough to tolerate the distortion between the biometric feature b extracted from different samples of the same biometric characteristic. For instance, an arbitrary minutia extracted from different fingerprint samples captured from the same finger can be different in its attributes' values (x, y, orientation, type, etc.) but a robust feature vector $f_2$ extracted from these distorted minutia features should be the same so that the feature is comparable as the output of the crypto-function module 130. This is because any input with even 1 bit distortion to the used crypto-function shall lead to a completely scrambled output from the crypto-function due to the error sensitivity of employed cryptographic operations. That is to say, a robust feature vector $f_2$ is a vector that is always the same when extracted from different samples of a particular biometric feature b, i.e. the robust feature vector $f_2$ is independent from differences in attributes' values of the biometric feature.

The crypto-function module 130 can implement any cryptographic function, e.g., cryptographic hash function such as one according to the SHA-n series algorithm or a block cipher such as one according to the AES or 3DES algorithm, with the purpose to generate scrambled padding values for the distinguishing feature vector $f_1$ via the modulo-N addition operation in the modulo-N addition operation module 140.

The crypto-function module 130 takes as first auxiliary data $ad_1$ as a secret key k after a randomization process provided by means of a cryptographic hash function module 150. Such a secret key k can be, e.g., a key for a cryptographic hash function or an encryption key for a block cipher.

The crypto-function module 130 takes as plain input two data: public data as second auxiliary data $ad_2$, for example a cryptographic algorithm parameter such as nonce data or an ID number for a biometric subject (individual), characteristic, or an application, and the robust feature vector $f_2$. In order to make the modulo-N addition operation by module 140 secure, the second auxiliary data $ad_2$ should be different for different biometric feature b captures, different characteristics, different individuals, and different applications. This can be achieved by suitable methods such as assigning different random values as the second auxiliary data $ad_2$ for different features, samples, characteristics, subjects, and applications if the biometric feature b are ordered in data format. Otherwise, for unordered biometric features b, the same second auxiliary data $ad_2$ may be used for all the features. For example, the minutia feature is a type of unordered biometric feature and it is impossible to assign unique second auxiliary data $ad_2$ to an individual minutia in a set of minutiae because there is no order or other meta-data to distinguish one minutia from another.

Incorporating the robust feature vector $f_2$, in addition to the second auxiliary data $ad_2$, as the input to the crypto-function module 130 has the following two reasons:

Firstly, the robust feature vector $f_2$, which is derived from the biometric feature b, can augment the second auxiliary data $ad_2$ to make the data to be processed by the crypto-function module 130 adaptive to the biometric feature b to some degree. This implies that two distinctly-differed biometric features b may generate two different robust feature vectors $f_2$. In this sense, the robust feature vector $f_2$ can be used as a self-constructed order to differentiate the biometric features b, especially those inherently-unordered ones which are unable to differentiate. For these unordered biometric features, the robust feature vector $f_2$ is the only factor to make the output of the crypto-function module 130 dynamically reflecting the difference in the biometric feature b. Thus, the robust feature vector $f_2$ enhances the security, when varied instead of the same output of the crypto-function module 130 are used to protect, via the modulo-N addition based padding operation, the distinguishing feature vector $f_1$, when multiple robust features vectors $f_1$ are unordered.

Secondly, the robust feature vector $f_2$ modulates the information about the biometric feature b into the output of the crypto-function module 130 and accordingly into the final fused data fd. Compared to a case using solely second auxiliary data $ad_2$ as the plain input, the output of the crypto-function module 130 is secured by both the first auxiliary data $ad_1$, which is a secret and thus unknown to an adversary, and the biometric feature b itself, which is unknown to an adversary, as well. This fact ensures that a compromise to an adversary of either the first auxiliary data $ad_1$ or the biometric feature b will not cause an immediate breach of the distinguishing feature vector $f_1$. For instance, if the first auxiliary data $ad_1$, which is a secret, is compromised, an adversary still needs to perform a guessing brute-force attack to find the biometric feature b. Such brut-force attack would have a complexity roughly equivalent to $2^{n-1}$ where n is the entropy of the biometric feature b in bits.

To which degree the distinguishing feature vector $f_1$ and the robust feature vector $f_2$ are distinguishing and robust depends on varied considerations. Distinguishing feature vectors $f_1$ and robust feature vectors $f_2$ with too high entropies may make the fused data fd sensitive to biometric inherent noise and increase the biometric system's false non-match rate; while distinguishing feature vectors $f_1$ and robust feature vectors $f_2$ with too low entropies may make the fused data over-tolerant to differences in the biometric feature b and increase the biometric system's false match rate. From the security and privacy perspective, distinguishing feature vectors $f_1$ and robust feature vectors $f_2$ with high entropies will be hard enough against a guessing brute-force attack on the biometric feature b and thus also well protect the secret first auxiliary data $ad_1$. However, once compromised, e.g., via breached first auxiliary data $ad_1$, the high entropy of the feature vectors $f_1$ and $f_2$ will facilitate an adversary to reconstruct the biometric feature b. On the other hand, low entropy of the distinguishing feature vectors $f_1$ and the robust feature vectors $f_2$ will facilitate a brute-force attack targeting at the biometric feature b and thus also be bad for protecting the secret first auxiliary data $ad_1$. However, once compromised, e.g., via breached first auxiliary data $ad_1$, the low entropy of $f_1$ and $f_2$ will hinder an adversary to accurately reconstruct the biometric feature b.

The fused data fd generated from the invention can be used directly as a protected, in the sense of secure, or privacy-enhanced, or privacy-preserved, biometric template that can be compared to another protected template resulting in a comparison score indicating the similarity of the two biometric features b corresponding to the two protected templates fd.

Actually in all Figures and the description thereof, a secret that needs to be bound with the biometric data b is denoted as $S_m$. All other application-specific secret parameters used in embodiments are denoted as k.

Figure 2A:
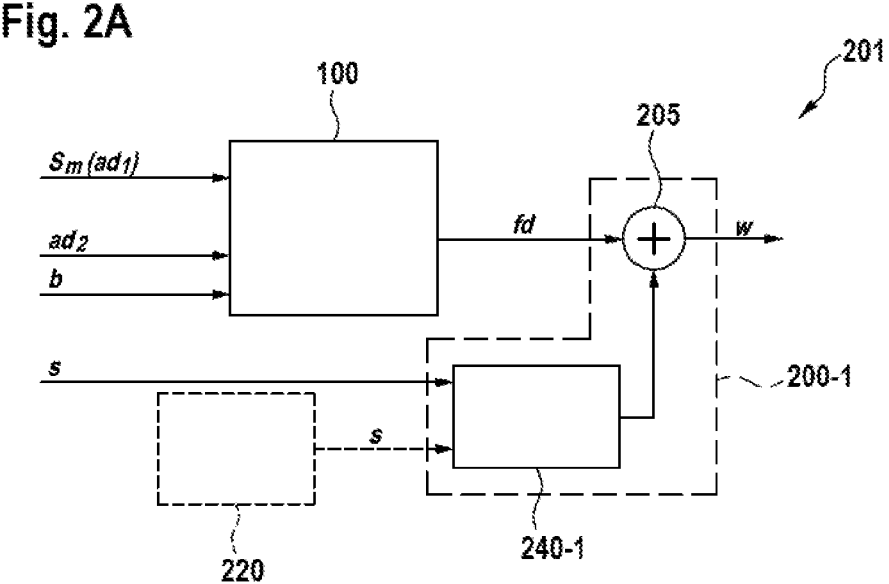
FIG. 2A illustrates by means of a block diagram a password protection method for a password managing system as a first application embodiment of the binding module of FIGS. 1A and 1B.

Now reference is made to FIG. 2A illustrating a password protection method as a first application embodiment of the novel binding module of FIGS. 1A and 1B, wherein the fused data fd produced from the binding module 100 is used in a fuzzy combination encoding module 200-1 to protect password data.

In the password binding method 201 of FIG. 2A, the binding module 100 of FIGS. 1A and 1B is used to generate fused data fd from: a user's master password $S_m$ as first auxiliary data $ad_1$; a crypto-function parameter, such as nonce data to a block cipher or seed data to a cryptographic hash function, as second auxiliary data $ad_z$; and the biometric feature b. The fused data fd, after being converted to a binary code, are combined with a user's password s, by means of the fuzzy combination encoding module 200-1.

The user's password s may be an already existing legacy password of the user or, alternatively, a new password generated on the fly, e.g. by means of a random key generation module 220. Password vault data w (as helper data) is the output of the fuzzy combination encoding module 200-1 and can be stored, for example, as a password shadow file in a password manager software.

An error correction encoder module 240-1 is configured to embed redundancy into the password s. The redundancy in the password s serves to tolerate fuzziness of the fused data fd.

The fuzzy combination encoding module 200-1 is configured to combine the error-correction encoded binary result of the password s with the binary code of the fused data fd by means of an exclusive-OR (XOR) bit operation module 205, denoted in FIG. 2A as a circle with a plus inside. The fuzzy combination encoding module 200-1 is used here to combine the fused data fd and the password s into secure vault data w (as helper data). Without knowing the fused data fd, the password s cannot be released from the vault data w.

The fuzzy combination encoding module 200-1 is a part of the conventional fuzzy commitment scheme, e.g. known from WO 2000/051244 A8. However, it is worth to be noted that the herein described embodiments do not adopt the hash-based verification procedure used in the conventional fuzzy commitment scheme known from WO 2000/051244 A8 because password verification is a process in most cases decided by a particular password authentication protocol which is outside of the scope of the here proposed solution.

Figure 2B:
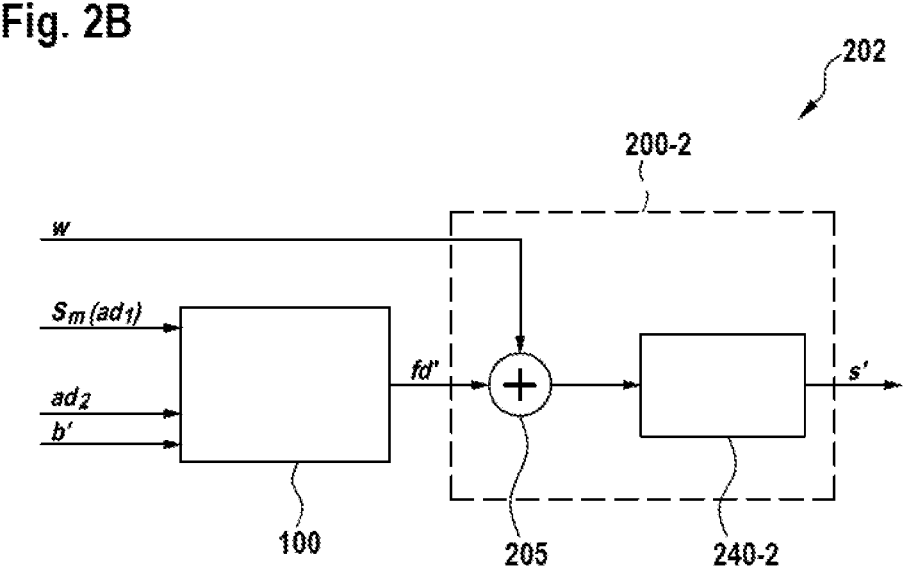
FIG. 2B illustrates by means of a block diagram a password releasing method corresponding to the password protection method of FIG. 2A.

Now reference is made to FIG. 2B illustrating a password releasing method 202 corresponding to the password protection method 201 of FIG. 2A.

The password releasing method 202 uses the binding module 100 of FIGS. 1A and 1B to generate the fused data fd' from: the user's master password $S_m$ as first auxiliary data $ad_1$; the crypto-function parameter, such as nonce data to a block cipher or seed data to a cryptographic hash function, as second auxiliary data adz; and a biometric feature b'. The fused data fd' can then be combined with the password shadow file, i.e., the password vault data w (as helper data) via the fuzzy combination decoding module 200-2.

An error correction decoder module 240-2 is configured to offset the difference in the fused data fd' from the fused data fd. Such differences can be attributed to the inherent biometric fuzziness based on distortion of the new biometric feature b' compared to the biometric feature b used in the password protection method 201 of FIG. 2A.

The released password s', given a correct user's master password $S_m$ and a correct biometric feature b', is exactly the same as the password s protected in the password protection method 201 of FIG. 2A.

Figure 3A:
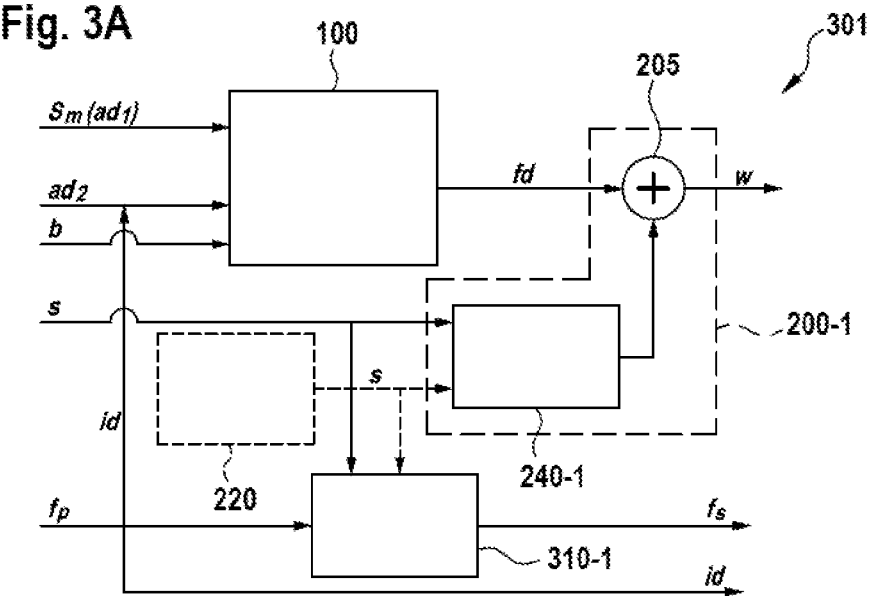
FIG. 3A illustrates by means of a block diagram a file encryption method of a personal file protection system as a second application embodiment of the binding module of FIGS. 1A and 1B.

Now reference is made to FIG. 3A illustrating by means of a block diagram a file encryption method 301 as a second application embodiment of the novel binding module 100 of FIGS. 1A and 1B.

In the file encryption method 301, the novel binding module 100 and the fuzzy combination encoding module 200-1 (described in connection with the embodiment of FIGS. 2A, 2B) is used to protect an encryption key s that may be a legacy file encryption key or, alternatively, a new encryption key generated on the fly by a random key generation module 220. The encryption key s is used to encrypt a plain personal file $f_p$ by an encryption encoder module 310-1 into an encrypted file $f_s$. The encryption encoder module 310-1 can be any suitable encryption module performing any known or future encryption encoding method that can be used to encrypt digital data such as the digital plain file $f_p$.

The output of the fuzzy combination encoding module 200-1 is encryption parameter vault data w (as helper data) which hides the encryption key s secured by means of the fused data fd.

A unique file ID id, such as a unique file name, a file hash, or a unique file code assigned to the file, is incorporated as part of the application-specific parameters as the second auxiliary data $ad_2$ to help generate unique fused data fd for protecting different encryption keys s via value padding done by the XOR bit operation module 205.

Figure 3B:
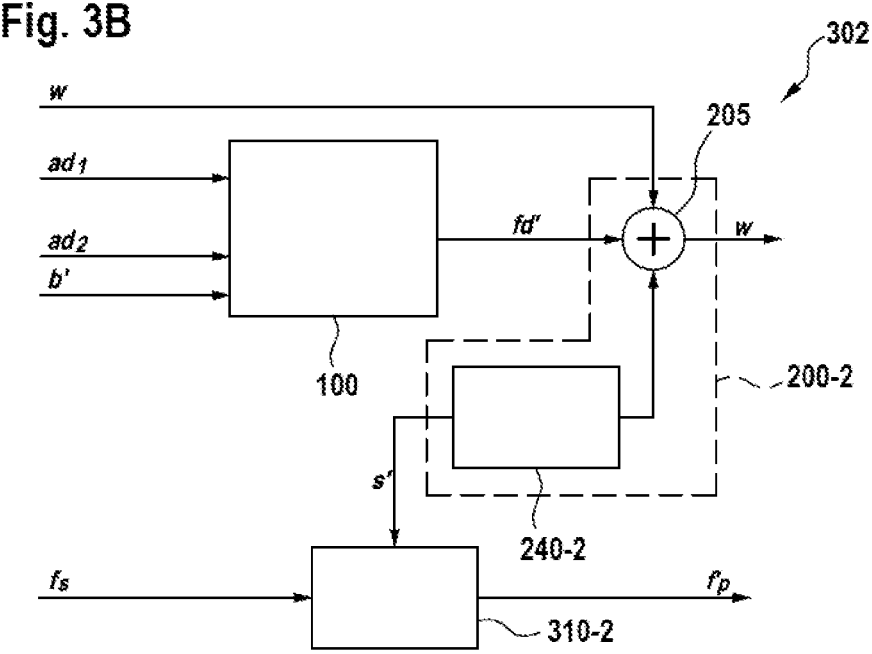
FIG. 3B illustrates by means of a block diagram a file decryption method corresponding to the file encryption method of FIG. 3A.

Now reference is made to FIG. 3B showing by means of a block diagram a file decryption method 302 corresponding to the file encryption method 301 of FIG. 3A.

The file decryption method 302 uses the novel binding module 100 and the fuzzy combination decoding module 200-2 to recover the file encryption key s' which is used to decrypt the encrypted personal file $f_s$ by means of an encryption decoder module 310-2 corresponding to the encryption encoder module 310-1 into a decrypted file $f'_p$.

Figure 4A:
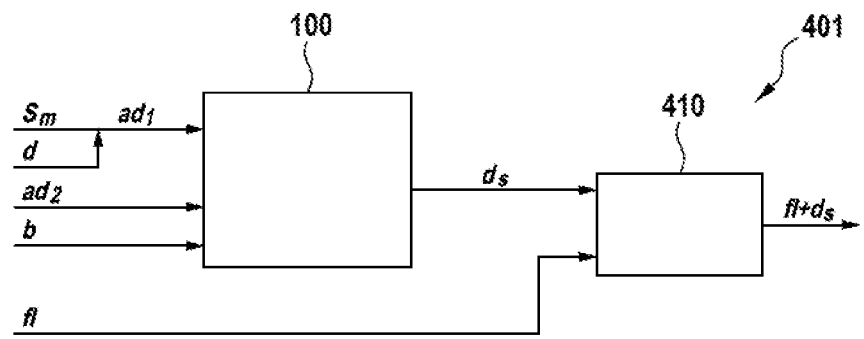
FIG. 4A illustrates by means of a block diagram a generation method for generating encrypted fuzzy indices from exact data as a first example of a third application embodiment of the binding module of FIGS. 1A and 1B.

Now reference is made to FIG. 4A illustrating a method 401 for generating an encrypted fuzzy index from exact data for an encrypted file fl as a first example of a third application embodiment of the binding module 100 of FIGS. 1A and 1B.

In this embodiment, the encrypted fuzzy index generation method 401 uses the binding module 100 to generate an encrypted file fuzzy index $d_s$. Meta data d of the digital file fl may be e.g. an original index, an annotation, a timestamp, a copyright data or authorship data of the file, etc., which are exact data that can be directly processed as the first auxiliary data $ad_1$ by the binding module 100. File meta data d and a user's master secret $S_m$, together are in this embodiment used as the first auxiliary data $ad_1$. There is again a biometric feature b of the user. The second auxiliary data $ad_2$ can be nonce data to a block cipher or seed data to a cryptographic hash function.

The binding module 100 outputs an encrypted fuzzy index $d_s$ corresponding to the fused data fd.

The generated encrypted fuzzy index $d_s$ is embedded to the file fl via an index embedding module 410. The index embedding module 410 can be configured to implement methods such as watermarking, appending, etc., in order to generate a file that is easy to index, i.e., able to be found via some unique information which herein is called index.

Figure 4B:
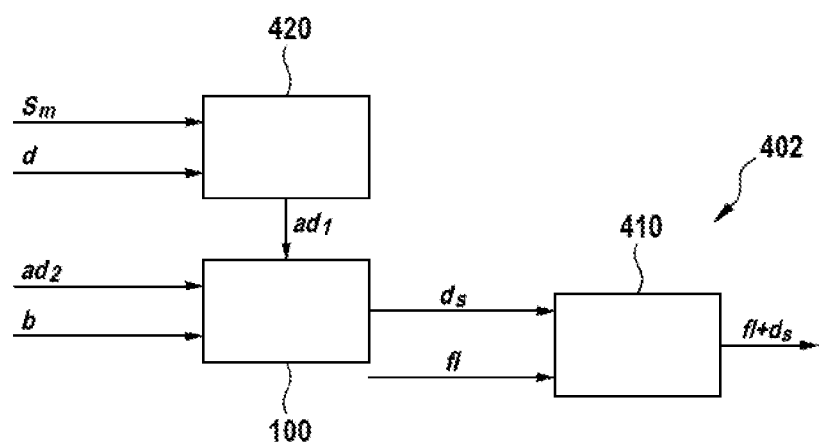
FIG. 4B illustrates by means of a block diagram a generation method for generating encrypted fuzzy indices from fuzzy data as a second example of the third application embodiment of the binding module of FIGS. 1A and 1B.

Now reference is made to FIG. 4B illustrating an alternative method 402 for generating an encrypted fuzzy index $d_s$ from fuzzy data as a second example of the third application embodiment of the binding module 100 of FIGS. 1A and 1B.

Now, file meta data d and a user's master secret $S_m$, together are subject to a robust hash function by means of a robust hash function module 420 to produce the first auxiliary data $ad_1$. There is again a biometric feature b of the user. The second auxiliary data $ad_2$ can be nonce data to a block cipher or seed data to a cryptographic hash function.

The generated encrypted fuzzy index $d_s$ is embedded to the file fl via an index embedding module 410 similar as that in FIG. 4A, in order to generate the indexable file.

The robust hash function module 420 can implement any known or suitable method for mapping input feature vectors which are close in distance to the same feature vector, such as text fuzzy hash, media perceptual hash, or any other file content digestion algorithms that can map slightly distorted contents to the same feature vector.

Figure 5A:
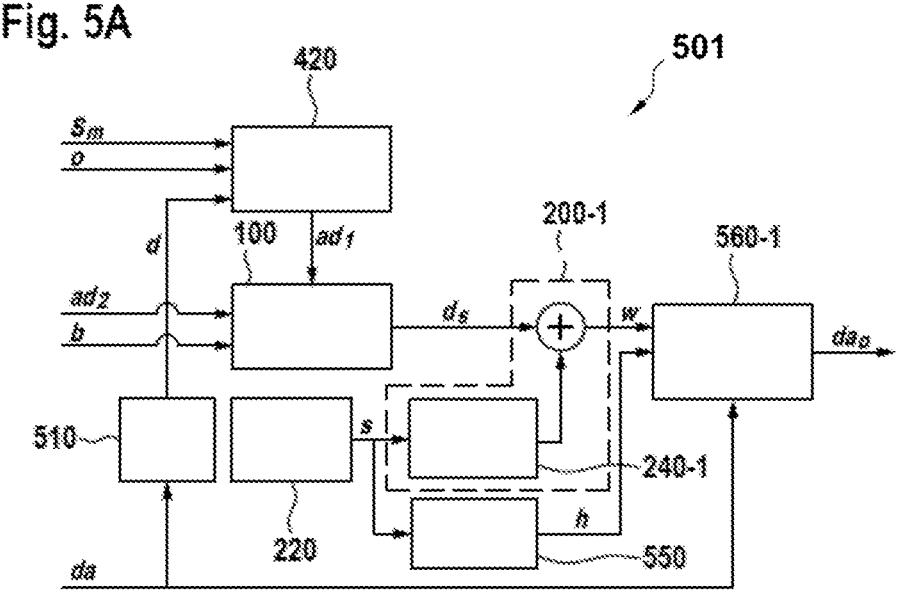
FIG. 5A illustrates by means of a block diagram an ownership data generation method for personal files of an ownership creation and verification system as a forth application embodiment of the binding module of FIGS. 1A and 1B.

Now reference is made to FIG. 5A illustrating by means of a block diagram an ownership creation method 501 for digital files da as digital assets as a forth application embodiment of the binding module 100 of FIGS. 1A and 1B.

The ownership creation method 501 for digital files da uses the binding module 100 and the fuzzy combination encoding module 200-1 as described in connection with FIGS. 2A and 2B to generate helper data w.

Further, verification data h, are generated. A crypto-hash function module 550, with the same purpose and function as the module 150 (cf. FIG. 1B), can be any cryptographic hash function, such as an algorithm according to MD5, SHA-n serials, etc. Here the module is used to generate the verification data h for a randomly generated secret key s.

Both, the helper data w and the verification data h are embedded via a data embedding module 560-1 into the digital file da. The data embedding module 560-1 can be configured to implement methods such as watermarking, appending, etc., in order to output an ownership verifiable personal digital asset $da_o$.

The encrypted ownership information $d_s$ is generated as the fused data fd by the binding module 100 from the first auxiliary data $ad_1$ and a biometric feature b. The first auxiliary data $ad_1$ is generated via a robust hash function module 420 from the user's master secret $S_m$ and the ownership certificate o which is usually signed by a trust third party that can act as an ownership verifier.

The digital asset content descriptor d is generated by means of a content descriptor generation module 510 from the digital file da directly. The content descriptor generation module 510 is configured to perform a process for generating description information for the personal digital assets, such as ownership, operation and use manual, content description, etc., which can be incorporated as part of information in the ownership certificate o. For media data or other types of fuzzy data, the digital asset content descriptor d can be fuzzy feature vectors and thus need to be processed by the robust hash function module 420 to get some stable data as second auxiliary data $ad_2$.

Figure 5B:
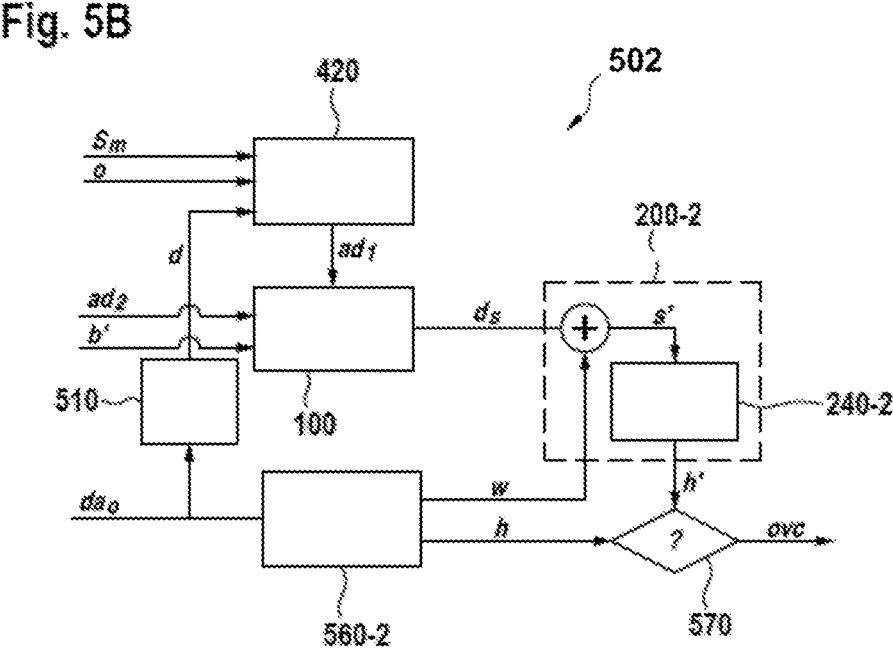
FIG. 5B illustrates by means of a block diagram an ownership data verification method corresponding to the ownership data generation method for personal files of FIG. 5A.

Now reference is made to FIG. 5B illustrating by means of a block diagram of an ownership verification method 502 for personal files $da_o$ as a digital asset which ownership verification method 502 corresponds to the ownership creation method 501 in FIG. 5A.

The personal files ownership verification method 502 uses the binding module 100 and the fuzzy combination decoding module 200-2 (as described in connection with FIG. 2B) to generate decoded verification data h', which should be exactly the same as the verification information h embedded in the digital asset da.

The decoded verification data h' can be extracted via a data extracting module 560-2, corresponding to the data embedding module 560-1 of FIG. 5A, from the ownership verifiable personal digital asset $da_o$. The ownership is correctly verified if it is found by means of a comparison module 570 that decoded verification data h' are identical to verification information h embedded in the digital asset da. The comparison module 570 outputs as a result ownership verification conclusion data ovc.

Figure 6:
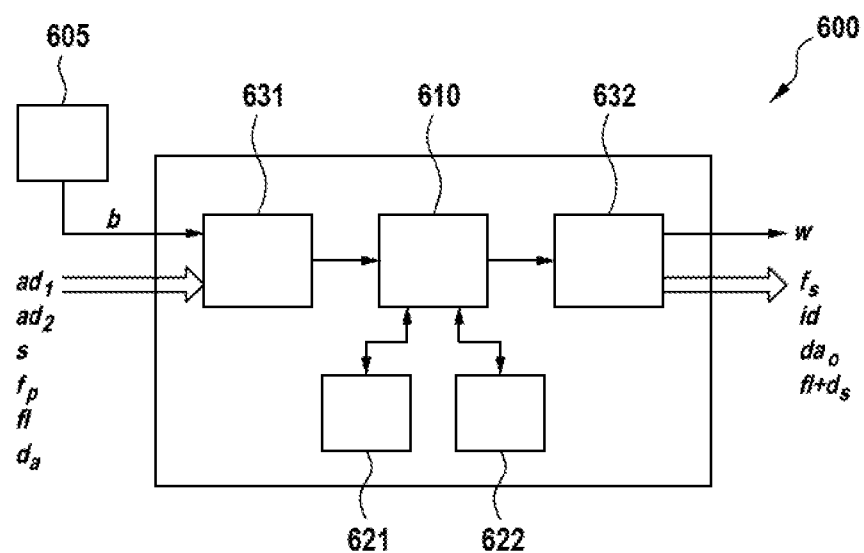
FIG. 6 illustrates a block diagram of an apparatus 600 for data processing that is configured to implement one of the methods illustrated in FIGS. 2A to 5B.

Now reference is made to FIG. 6 showing by means of a block diagram an apparatus 600 for data processing configured to implement one of the methods illustrated in FIGS. 2A to 5B.

The apparatus 600 for data processing comprises at least one digital processing unit 610 such as central processing unit (CPU). The apparatus 600 further comprises a working memory 621 interconnected with digital processing unit 610 via applicable data connection such as a data and control bus. The working memory 621 may be any kind of digital memory such as random access memory (RAM) for storing data to be processed as well as for storing processing results. The apparatus 600 further has at least one interface 631 for receiving data to be processed. Correspondingly, the apparatus 600 further has at least one interface 632 to output processing results. The apparatus 600 further comprises a permanent memory 622 such as a read only memory (ROM) for storing program code with computer program instructions.

The program code inter alia may comprise one or more computer programs which when executed by the digital processing unit 610 cause the processing unit 610 to perform one or more of the methods discussed herein before for protection of personal files (Personal File Protection), management of personal passwords (Personal Password Manager), generating encrypted fuzzy indexing of personal files from exact or fuzzy data, creation and verification of the ownership data for personal digital files as digital assets etc.

The apparatus 600 may be a personal computing device, a smart phone device, a personal digital assistant device, an automatic teller machine, a logical and physical access control system, an automated border control system, etc.

The required raw biometric feature as one input can be obtained from an individual by suitable sensors configured to take biometric sample data from a corresponding biometric characteristic of an individual. Thus, the apparatus 600 comprises or is coupled or is connected to at least one sensor 605 which is respectively configured for at least one of: recording a voice sample of the individual, taking a 2D or 3D facial or ear picture of the individual, scanning a fingerprint or a finger vein pattern of the individual, scanning a hand or foot geometric pattern or a palm or foot print, scanning an iris or eye vascular pattern of the individual.

The invention claimed is:

1. An apparatus for binding biometric feature data of an individual with a secret of the individual, the apparatus comprising:
  a distinguishing feature extractor module (110) that is configured for generating a distinguishing feature vector (f1) from a raw biometric feature (b) of the individual, said distinguishing feature vector (f1) being configured for differentiating individuals;
  a robust feature extractor module (120) that is configured for generating a robust feature vector (f2) from said raw biometric feature (b) of the individual, said robust feature vector (f2) is tolerant to distortion of the raw biometric feature (b) of the individual and being the same when generated from different samples of the raw biometric feature (b) of the individual;
  a hash function module (150) that is configured for generating a cryptographic key (k) from first auxiliary data (ad1), said first auxiliary data (ad1) being based at least upon the secret (Sm) of the individual and based upon other data;
  a cryptographic module (130) that is configured for inputting said robust feature vector (f2) and second auxiliary data (ad2), and configured to perform a cryptographic function keyed by said cryptographic key (k), and configured for outputting results (cr); and
  a modulo-N addition operation module (140) that is configured for performing an exclusive-OR operation upon a combination of said results (cr) and said distinguishing feature vector (f1), and outputting result of said exclusive-OR operation as fused data (fd), wherein the fused data (fd) is a binding of the raw biometric feature (b) of the individual with the results (cr) as output from the cryptographic module, wherein the results (cr) is computed at least in part from the secret (Sm) of the individual, to protect the raw biometric feature (b) of the individual.

2. The apparatus of claim 1, further configured for tuning a weight of biometric information bound in said fused data (fd) by adjusting an entropy of said robust feature vector (f2) upon said generating the robust feature (f2) from the raw biometric feature (b) of the individual, and adjusting an entropy of the distinguishing feature vector (f1) upon said generating the distinguishing feature vector (f1) from the raw biometric feature (b) of the individual.

3. The apparatus of claim 1, further configured for combining the fused data (fd) by means of a fuzzy combination encoding module with data to be protected and/or application dependent data into helper data (w).

4. The apparatus of claim 3, wherein the first auxiliary data (ad1) comprises a master secret as the secret (Sm) of the individual, the second auxiliary data (ad2) comprises crypto-function parameter data, including nonce data to a block cipher or seed data to a cryptographic hash function; and the data to be protected comprises a password (s) being a legacy password or a randomly generated password, whereby the helper data (w) are secure password vault data.

5. The apparatus of claim 3, further configured for encrypting a digital file (fp) by means of a standard encryption encoder module keyed by an encryption key (s) and configured to receive the digital file (fp) as input and to output an encrypted file (fs),
  wherein, if the digital file (fp) is already encrypted by a legacy file encryption key, then using the legacy file encryption key as the encryption key (s) in the step of encrypting the digital file (fp), else generating an ephemeral random secret encryption key by means of an ephemeral random secret encryption key generator module which ephemeral random secret encryption key is used as the encryption key (s); and
  wherein the first auxiliary data (ad1) comprise a master secret as the secret (Sm) of the individual, the second auxiliary data (ad2) comprise application specific data and/or unique identification data (id) of the digital file (fp), and the data to be protected comprise the encryption key (s), whereby the helper data (w) are encryption parameter vault data.

6. The apparatus of claim 2, wherein the first auxiliary data (ad1) comprises:
  a master secret of the individual and meta data (d) of a digital file (f1) or, alternatively, a robust hash function result obtained from the master secret of the individual and content data of the digital file (f1); and the second auxiliary data (ad2) comprises crypto-function parameter data, including nonce data to a block cipher or seed data to a cryptographic hash function, whereby the fused data (fd) comprises encrypted fuzzy index data (ds) for the digital file (f1); and wherein the apparatus further
  configured to embed the encrypted fuzzy index data (ds) by means of an index embedding module into a plain or an encrypted digital file, whereby the digital file (f1) is made indexable by means of the encrypted fuzzy index data (ds).

7. The apparatus of claim 6, wherein the first auxiliary data (ad1) comprises a robust hash function result obtained from the master secret of the individual, signed authorized ownership certificate data, and a content descriptor data generated by means of a content descriptor generator module from plain or encrypted digital asset data (da); the second auxiliary data (ad2) comprises crypto-function parameter data, including nonce data to a block cipher or seed data to a cryptographic hash function, whereby the fused data (fd) comprises encrypted ownership information data for the plain or encrypted digital asset data (da).

8. The apparatus of claim 7, further configured for
  combining the encrypted ownership information data as the fused data (fd) by means of a fuzzy combination encoding module, with an ephemeral random secret key (s) into ownership vault data (w), and
  embedding the ownership vault data (w) into the plain or encrypted digital asset data (da) by means of a data embedding module.

9. The apparatus of claim 1 further comprising a digital processing unit, working memory for storing data to be processed and processing results, an interface for receiving data to be processed and an interface to output processing results, and permanent memory for storing program code with computer program instructions which, when executed by the digital processing unit, causes the digital processing unit to perform functions of the distinguishing feature extractor module, the robust feature extractor module, the hash function module, the cryptographic module, and the modulo-N addition operation module, and wherein this apparatus is one of a group comprising: a personal computing device, a smart phone device, a personal digital assistant device, an automatic teller machine, a logical and physical access control system, an automatic border control system.

10. The apparatus of claim 9, wherein said raw biometric feature (b) is a biometric modality that is obtained from the individual by at least one sensor, wherein the apparatus comprises or is coupled or is connected to the at least one sensor respectively configured for recording a voice sample of the individual, taking a 2D or 3D facial or ear picture of the individual, scanning a fingerprint or a finger vein pattern of the individual, scanning a hand or foot geometric pattern or a palm or foot print, scanning an iris or eye vascular pattern of the individual.

* * * * *